(12) United States Patent
Wu et al.

(10) Patent No.: US 11,222,505 B2
(45) Date of Patent: Jan. 11, 2022

(54) DEVICE AND SYSTEM WITH INTEGRATED CUSTOMER SERVICE COMPONENTS

(71) Applicant: IGT, Las Vegas, NV (US)

(72) Inventors: Xiang Wu, Beijing (CN); Jun Li, Beijing (CN); Haiyun Zhang, Beijing (CN)

(73) Assignee: IGT, Las Vegas, NV (US)

( * ) Notice: Subject to any disclaimer, the term of this patent is extended or adjusted under 35 U.S.C. 154(b) by 325 days.

(21) Appl. No.: 16/403,755

(22) Filed: May 6, 2019

(65) Prior Publication Data

US 2020/0357227 A1 Nov. 12, 2020

(51) Int. Cl.
| | |
|---|---|
| G10L 25/00 | (2013.01) |
| G10L 15/00 | (2013.01) |
| G07F 17/32 | (2006.01) |
| G10L 15/26 | (2006.01) |
| G06Q 30/02 | (2012.01) |
| G10L 15/08 | (2006.01) |

(52) U.S. Cl.
CPC ..... *G07F 17/3234* (2013.01); *G06Q 30/0281* (2013.01); *G07F 17/3227* (2013.01); *G10L 15/26* (2013.01); *G10L 2015/088* (2013.01)

(58) Field of Classification Search
CPC ............... G06Q 30/0281; G06Q 10/06; G06Q 10/06316; G06Q 30/016; G07F 17/3227; G07F 17/3234; G10L 15/1822; G10L 15/22; G10L 15/26; G10L 2015/088; G10L 15/00; H04L 51/02; H04L 51/046; H04L 51/24; H04L 51/30; H04M 3/2281; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/2011; H04M 2203/2061; H04M 2242/00; H04M 2242/08; H04M 2242/12; H04W 4/14
USPC ......... 704/9, 200, 231, 246, 251, 270, 270.1
See application file for complete search history.

(56) References Cited

U.S. PATENT DOCUMENTS

| 8,753,183 B2 * | 6/2014 | Davison .................. A63F 13/00 463/9 |
| 2005/0209008 A1 * | 9/2005 | Shimizu ............... G07F 17/3255 463/43 |

(Continued)

*Primary Examiner* — Khai N. Nguyen
(74) *Attorney, Agent, or Firm* — Sheridan Ross P.C.

(57) ABSTRACT

The present disclosure relates generally to a server that manages a plurality of gaming machines. As a non-limiting example, the server may include instructions that receive a message indicating that a user has requested assistance in connection with a gaming machine, instructions that analyze the message to determine a type of assistance required to satisfy the user request, instructions that determine a destination address for a service communication device, where the service communication device is selected based on the type of assistance required to satisfy the user request, and instructions that cause a service request message to be transmitted to the destination address.

20 Claims, 7 Drawing Sheets

(56) References Cited

U.S. PATENT DOCUMENTS

| | | | |
|---|---|---|---|
| 2007/0294089 A1* | 12/2007 | Garbow | G06Q 30/0216 |
| | | | 705/26.1 |
| 2009/0088233 A1* | 4/2009 | O'Rourke | A63F 13/12 |
| | | | 463/7 |
| 2013/0116022 A1* | 5/2013 | Davison | A63F 13/355 |
| | | | 463/9 |
| 2014/0046891 A1* | 2/2014 | Banas | G06N 5/022 |
| | | | 706/46 |
| 2018/0001205 A1* | 1/2018 | Osman | A63F 13/5375 |
| 2018/0218627 A1* | 8/2018 | Smith Lewis | G09B 7/04 |
| 2018/0270350 A1* | 9/2018 | Engelke | H04M 1/2475 |
| 2020/0357227 A1* | 11/2020 | Wu | G10L 15/26 |

* cited by examiner

DEVICE AND SYSTEM WITH INTEGRATED CUSTOMER SERVICE COMPONENTS

BACKGROUND

The present disclosure is directed toward a gaming machines and, in particular, gaming machines having integrated customer service components as well as systems to support the same.

Electronic Gaming Machines (EGMs), such as slot machines, video poker machines, and the like generally provide players with the ability to provide entertainment via game interactions. If an EGM malfunctions or becomes otherwise inoperable, it is often incumbent on a casino employee to notice a service light on the EGM. Improperly functioning EGMs can result in increased maintenance costs as well as lost revenue to a casino.

BRIEF SUMMARY

In certain embodiments, the present disclosure relates to a method of enabling responses to a service request at a gaming machine, a gaming system, and a server that manages gaming machines. In some embodiments, the method includes receiving, at a processor, a message indicating that a user has requested assistance in connection with an operation of a gaming machine; analyzing, with the processor, content of the message to determine a type of assistance required to satisfy the user request; determining, with the processor, a destination address for a service communication device, where the service communication device is selected based on the type of assistance required to satisfy the user request; generating, with the processor, a service request message that is formatted based on the type of assistance required to satisfy the user request; and transmitting, with the processor and via a communication network, the service request message to the destination address.

In some embodiments, the present disclosure also relates to a gaming system including a communication interface, a processor coupled with the communication interface, and a computer-readable storage medium, coupled with the processor, including instructions that are executable by the processor. In some embodiments, the instructions include: instructions that receive a message from a gaming machine indicating that a user has requested assistance; instructions that analyze the message to determine a type of assistance required to satisfy the user request; instructions that determine a destination address for a service communication device, where the service communication device is selected based on the type of assistance required to satisfy the user request; and instructions that cause a service request message to be transmitted to the destination address via the communication interface.

In some embodiments, the present disclosure also relates to a server that manages a plurality of gaming machines that includes a processor and a computer-readable storage medium, coupled with the processor, including instructions that are executable by the processor. In an example, the instructions may include: instructions that receive a message indicating that a user has requested assistance in connection with a gaming machine; instructions that analyze the message to determine a type of assistance required to satisfy the user request; instructions that determine a destination address for a service communication device, where the service communication device is selected based on the type of assistance required to satisfy the user request; and instructions that cause a service request message to be transmitted to the destination address.

Additional features and advantages are described herein and will be apparent from the following Description and the figures.

DETAILED DESCRIPTION

Figure 1:
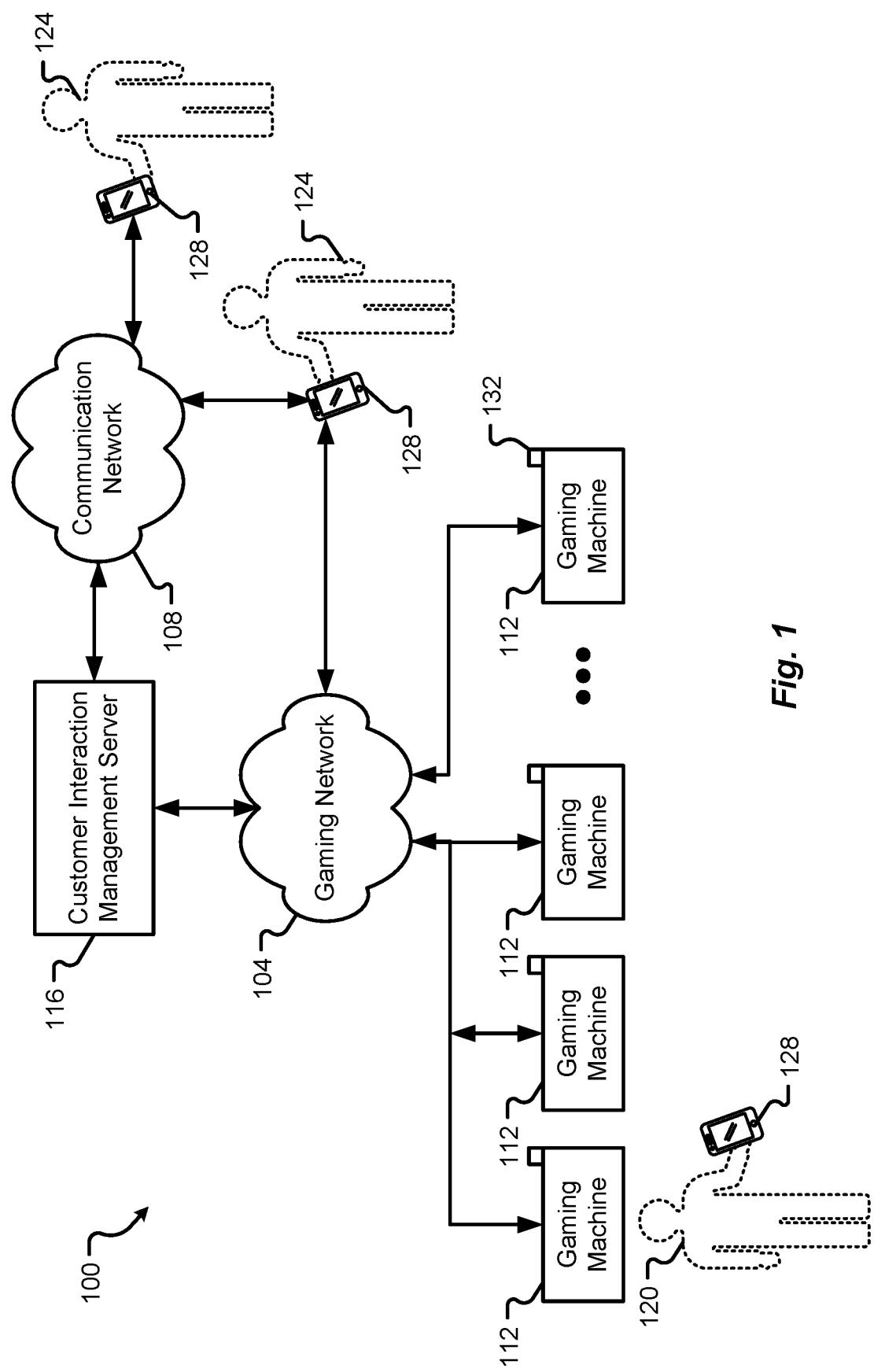
FIG. 1 illustrates a gaming system in accordance with embodiments of the present disclosure.

Embodiments of the present disclosure will be described in connection with a gaming system, servers, gaming machines, and other computational devices. While embodiments of the present disclosure will be described in connection with the example of a gaming machine having customer service components integrated therein, it should be appreciated that embodiments of the present disclosure are not so limited. For instance, other types of devices or machines provided in casinos (e.g., Electronic Table Games (ETGs), Video game Gambling Machines (VGMs), table games, hand-held user devices, and the like may be provided with integrated customer service components and may have customer service interactions managed by a casino server as will be described herein. Furthermore, it should be appreciated that embodiments of the present disclosure may apply to gaming machines that operate games of chance other than table games, card games, dice games, or the like. For instance, embodiments of the present disclosure may be used in connection with any type of game such as bingo, keno, slots, roulette, games of skill, video games, etc.

In many casinos, the service button on the gaming machine has limited functions. When a player has some needs (e.g., desires a beverage, desired food, or the gaming machine is having technical problems), the player may push the service button and the top light of the gaming machine will begin flashing. The player will sit and wait for help until a casino employee or operator is able to visibly see the top light flashing at which point the casino employee usually approaches the player to ask what type of service is required. In many circumstances, the casino employee that approaches the player is not capable of providing the player with the required service. Rather, the casino employee is usually required to call different departments of the casino to ask, on behalf of the player, how to resolve the issue identified by the player. It should be apparent that this inefficient manner of responding to a player's request may frustrate the player, lead to unnecessary machine downtime, result in lost revenue, and present many other problems for a casino operator.

Embodiments of the present disclosure seek to remedy these and other issues associated with traditional gaming machines. In some embodiments, a gaming machine is provided with an integrated customer service interface that leverages the hardware of the gaming machine to enable a player to request and receive assistance directly from qualified service representatives in a manner that is much more efficient than waiting on a casino employee to walk by and notice the light flashing on top of the gaming machine. More specifically, a gaming machine is described to include service interface instructions that are invoked when a player of the gaming machine engages a help button or the like provided on the gaming machine. In some embodiments, the service interface instructions may launch a set of capabilities for the gaming machine that enable the player to provide voice inputs at the gaming machine, utilize push-to-talk functionality to send voice messages to a customer service representative, and/or have a real-time conversation with a customer service representative.

In some embodiments, a server is also provided with the ability to receive and process the various types of messages received from a gaming machine and determine how best to dispatch the messages based on content of the messages. In this way, the server is provided with the ability to service one or multiple customer service requests by transmitting appropriate service request messages to one or more different customer service representatives. It should be appreciated that the service request messages may be provided in the native format of the messages received from the gaming machines (e.g., as voice messages) or they messages received from the gaming machines may be converted to a different medium, depending upon the capabilities of the devices being used by the customer service representative. Alternatively or additionally, the player may request a certain type of service (e.g., real-time voice service, text or chat service, offline service/reporting gaming machine technical problems, or basic food/beverage service) and the format of the message transmitted to the customer service representative may be modified based on the type of service requested by the player.

As an example, if the player indicates that he/she desires to speak with a customer service representative in real-time, then a text message may be transmitted to a customer service representative's communication device indicating that an audio channel will be opened between the gaming machine and the customer service representative's communication device. This text message may include some or all of the player's original message along with an indication of the type of service requested by the player. If the customer service representative accepts the service request and selects an appropriate input on the text message, then the audio channel may be established between the gaming machine and the communication device of the customer service representative. If the customer service representative does not accept the service request (e.g., because the customer service representative is currently busy handling another request), then the server may transmit another text message to a different customer service representative until the text message is accepted and the player's service request is satisfied. It should be appreciated that the customer service representative may or may not be in the same physical location as the gaming machine/player, but the user input devices, output devices, network interfaces, and service indicators of the gaming device may be leveraged to enable the player to receive immediate service from a customer service representative, whether or not the customer service representative is remotely located. For casinos, embodiments of the present disclosure can help to simplify operational procedures, improve service efficiencies, and improve the user experience to attract more players.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system according to embodiments of the present disclosure may include one, some, or all of the components depicted in the system 100 and does not necessarily have to include all of the components in a single device. For instance, the components of a customer interaction management server 116 may be distributed among a plurality of servers, where one or more of the servers enable management of customer interactions for a number of different assets in a casino, not necessarily limited to gaming machines. The illustration of a single customer interaction management server 116 is for ease of discussion and should not be construed as limiting embodiments of the present disclosure to a single-server architecture. Also for instance, a gaming machine 112 does not necessarily need to correspond to an EGM, but rather may correspond to any type of casino game such as a VGM, ETG, a table game, a card game, a dice game, a roulette game, or the like that is implemented using video, physical tables and game pieces, virtual reality, augmented reality, or a combination thereof.

The gaming system 100 is shown to include a gaming network 104 and a communication network 108. The gaming network 104 may correspond to a distributed set of devices that interconnect and facilitate machine-to-machine communications between one or multiple gaming machines 112 and the customer interaction management server 116. The communication network 108 may correspond to a distributed set of devices that interconnect and facilitate machine-to-machine communications between the customer interaction management server 116 and mobile devices 128 carried by customer service representatives 124. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

A gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming machines 112 are configured to communicate with the customer interaction management server 116 using devices that are owned and administered by the same entity that administers security settings of the gaming machines 112. As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming machines 112. Thus, the communication network 108 may be considered an untrusted or unsecure network from the perspective of the gaming network 104. The Internet is an example of the communication network 108 that constitutes an IP network consisting of many computers, computing networks, and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) and/or Internet Service Provider (ISP) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming machines 112 may be distributed throughout a single property or premises (e.g., a single casino floor) or the gaming machines 112 may be distributed among a plurality of different properties. In a situation where the gaming machines 112 are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming machines 112 may utilize the same or different types of communication protocols to connect with and communicate over the gaming network 104. It should also be appreciated that the gaming machines 112 may or may not present the same type of game to a customer service representative 124.

In some embodiments, the gaming machines 112 may be configured to communicate with a centralized server in the form of the customer interaction management server 116. The customer interaction management server 116 may be configured to centrally manage games of chance played at the gaming machines 112 (e.g., table games, video poker, roulette, card games, dice games, slot games, lottery games, keno games, combinations thereof, etc.), monitor player 120 activity at the gaming machines 112, track player 120 requests associated with a gaming machine 112, facilitate communications between players 120 and customer service representatives 124, track progress associated with fulfilling or satisfying a player's 120 service request, facilitate communications with customer service representatives 124 via mobile devices 128, establish or negotiate audio channels between a gaming machine 112 and a mobile device 128 of a customer service representative 124, and/or perform any other task in connection with games played by a player 120 at the gaming machines 112.

The customer interaction management server 116 may be configured to communicate with one or multiple mobile devices 128 via the gaming network 104 and/or communication network 108. The customer interaction management server 116 may be provided with the ability to distribute and manage customer service requests among various customer service representatives 124.

The customer interaction management server 116 may also be configured to communicate with mobile devices 128 that are carried by players 120, whether or not the mobile device 128 is paired with a gaming machine 112. In some embodiments, the customer interaction management server 116 may be configured to communicate with a mobile device 128 of a player 120 via a communication network 108. Such communications may be directed toward the player's 120 mobile device 128 or facilitated by an application running on the mobile device 128. Alternatively or additionally, the communications between the customer interaction management server 116 and the player's 120 mobile device 128 may flow through the gaming machine 112 if the gaming machine 112 and mobile device 128 are appropriately paired with one another (e.g., via a proximity-based communication protocol). Thus, the customer interaction management server 116 may operate as a hub of communication between a mobile device 128 of a customer service representative 124 and a mobile device 128 of a player 120. In other embodiments, the customer interaction management server 116 may facilitate communications between a customer service representative 124 and a player 120 by establishing a communication channel between the gaming machine 112 at which the player 120 is playing and the mobile device 128 of the customer service representative 124.

Although the customer service representatives 124 are shown as only having mobile devices 128, it should be appreciated that one or more customer service representatives 124 may utilize other types of communication and/or computing devices to handle a player's 120 service request. For instance, a customer service representative 124 may utilize a Personal Computer (PC), laptop, Personal Digital Assistant (PDA), wearable device, or combinations thereof.

In some embodiments, a mobile device 128 may be configured to communicate directly with a gaming machine 112. Direct communications may utilize a proximity-based communication protocol such as NFC, Bluetooth®, BLE, WiFi, or the like. Alternatively or additionally, the mobile devices 128 may be configured to communicate with other mobile devices 128 and/or the customer interaction management server 116 via the communication network 108. Such communications may be secured (e.g., encrypted) or unsecured depending upon the nature of information exchanged during the communications. A mobile device 128 may correspond to a customer service representative's 124 device or a personal device of a player 120.

It should be appreciated that the customer interaction management server 116 may or may not be co-located with the gaming machines 112. Further still, customer service representatives 124 may be allowed to carry multiple mobile devices 128, which may or may not be required to communicate or pair with a gaming machine 112.

The gaming machines 112 are also shown to include a service indicator 132. The service indicator 132 may correspond to an audible transducer and/or light transducer that is configured to produce a sound and/or light in response to a player 120 issuing a service request at the gaming machine 112. Alternatively or additionally, the service indicator 132 may be configured to automatically activate (e.g., produce a sound and/or light) in response to a particular event occurring at the gaming machine 112. Examples of events that may cause the service indicator 132 to automatically activate include a wager win, a jackpot win, a machine malfunction, a machine error, a software error, a detection of tamper, and the like. In some embodiments, the service indicator 132 may be configured to be activated by the player 120 when the player 120 issues a service request by to the customer interaction management server 116. If the service indicator 132 is activated in response to the issuance of a service request, then the gaming machine 112 may relinquish control of the service indicator 132 to the customer interaction management server 116 or at least wait until a predetermined message or command is received back from the customer interaction management server 116 indicating that the customer service representative(s) 124 has successfully attended to the player's 120 service request.

Figure 2:
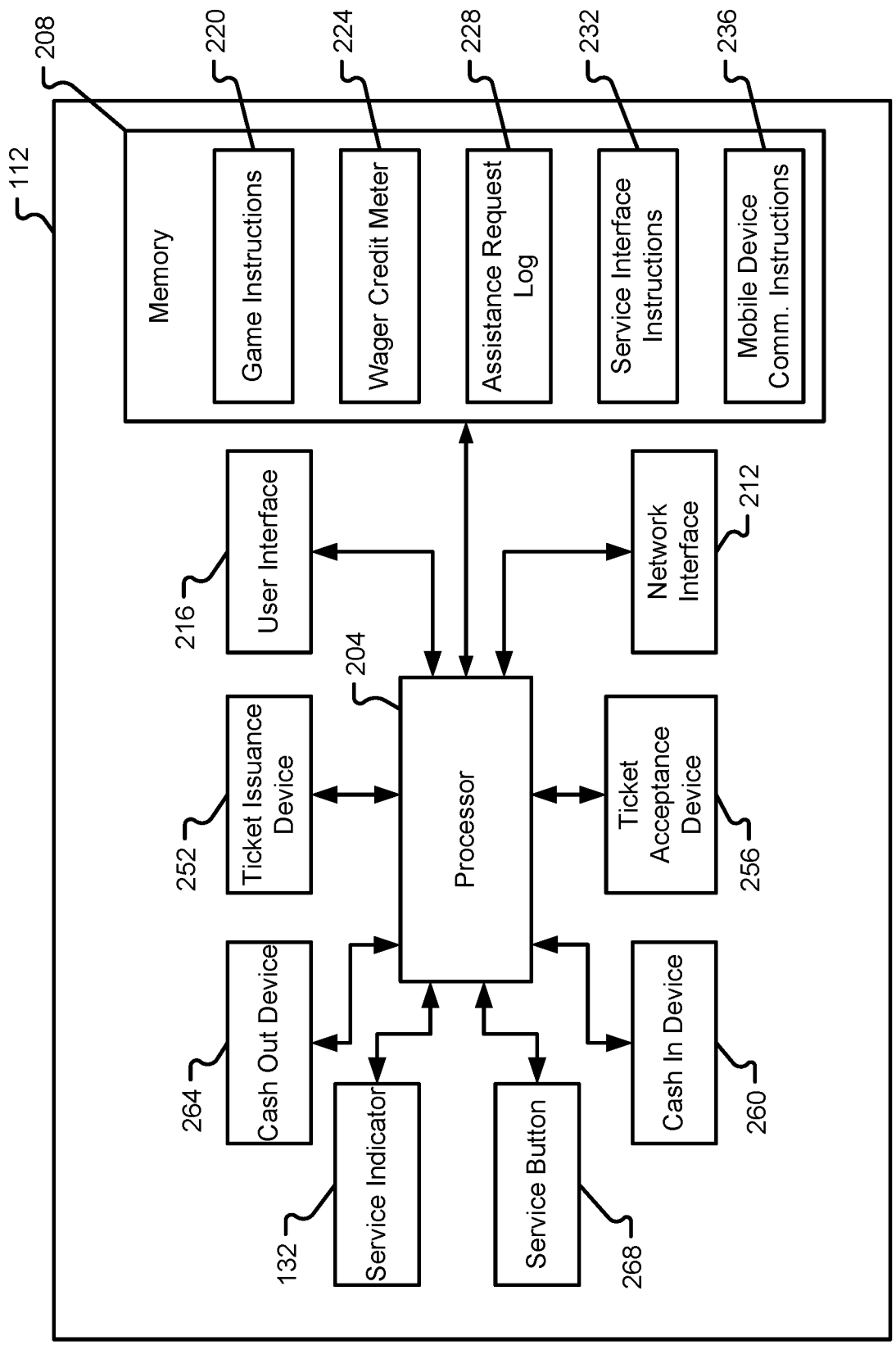
FIG. 2 illustrates a gaming machine in accordance with embodiments of the present disclosure.

With reference now to FIG. 2, additional details of the components that may be included in a gaming machine 112 will be described in accordance with at least some embodiments of the present disclosure.

A gaming machine 112 may correspond to a portable or non-portable device used for executing a gaming application or multiple different gaming applications without departing from the scope of the present disclosure. Non-limiting examples of a gaming machine 112 include an EGM, a VGM, a mobile communication device (e.g., a smartphone, laptop, wearable device, etc.), a kiosk, a laptop, a PC, etc. The illustrative gaming machine 112 depicted herein may include a support structure, housing or cabinet, which provides support for a plurality of displays, inputs, controls and other features of a conventional gaming machine. In some embodiments, a player 120 plays gaming machine 112 while sitting, however, the gaming machine 112 is alternatively configured so that a user can operate it while standing or sitting. The illustrated gaming machine 112 can be positioned on the floor but can be positioned alternatively (i) on a base or stand, (ii) as a pub-style table-top game (e.g., where the participant computational devices are located remotely from the shared wheel as discussed below), (iii) as a stand-alone computational device on the floor of a casino with other stand-alone computational devices, or (iv) in any other suitable manner. The gaming machine 112 can be constructed with varying cabinet and display configurations.

The gaming machine 112 is shown to include a processor 204, memory 208, a network interface 212, and a user interface 216. In some embodiments, the processor 204 may correspond to one or many microprocessors, CPUs, microcontrollers, Integrated Circuit (IC) chips, or the like. The processor 204 may be configured to execute one or more instruction sets stored in memory 208. In some embodiments, the instruction sets stored in memory 208, when executed by the processor 204, may enable the gaming machine 112 to provide game play functionality.

The nature of the network interface 212 may depend upon whether the network interface 212 is provided in cabinet-style gaming machine 112 or a mobile gaming machine 112. Examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the gaming machine 112 is connecting to a single gaming network 104 or multiple different types of gaming networks 104. For instance, the gaming machine 112 may be provided with both a wired network interface 212 and a wireless network interface 212 without departing from the scope of the present disclosure.

The user interface 216 may include a combination of user input devices and user output devices. For instance, the user interface 216 may include a display screen, speakers, buttons, levers, a touch-sensitive display, or any other device that is capable of player 120 interaction with the gaming machine 112. The user interface 216 may also include one or more drivers for the various hardware components that enable player 120 interaction with the gaming machine 112.

The memory 208 may include one or multiple computer memory devices that are volatile or non-volatile. The memory 208 may be configured to store instruction sets that enable user interaction with the gaming machine 112 and that enable game play at the gaming machine 112. Examples of instruction sets that may be stored in the memory 208 include a game instruction set 220, a wager credit meter 224, and a service interface instruction set 232. In addition to the instruction sets, the memory 208 may also be configured to store a random number generator that is used by the game instruction set 220 to provide game outputs. The gaming machine 112 is also shown to include a mobile device communication instruction set 236 that may enable the gaming machine 112 to exchange electronic communications with a mobile device 128, either directly or indirectly.

In addition to instruction sets, the memory 208 may also be configured to store an assistance request log 228 that includes an electronic record of service request issued at the gaming machine 112. In some embodiments, the assistance request log 228 may be organized and maintained by the service interface instruction set 232 alone or in cooperation with inputs from the customer interaction management server 116. As a non-limiting example, the assistance request log 228 may include a listing of electronic records that indicate when service requests were issued by a player 120 at the gaming machine 112, a type of the service request (e.g., as determined by the customer interaction management server 116), a duration of time that the service request was pending before it was assigned to a customer service representative 124, a duration of time that the service request was pending before it was resolved by a customer service representative 124, at time at which the service request was resolved, an identifier of the player 120 that issued the service request, an identifier of the customer service representative(s) 124 that attended to the service request, a customer satisfaction score received from a player 120 after the service request was resolved, and combinations thereof. The assistance request log 228 may also be configured to store (partially or completely) copies of messages transmitted from the gaming machine 112 to the customer interaction management server 116 or received at the gaming machine 112 in connection with a service request. In other words, the assistance request log 228 may be configured to store listings of data in a database structure and/or files associated with service requests.

In some embodiments, the game instruction set 220, when executed by the processor 204, may enable the gaming machine 112 to facilitate one or more games of chance or skill and produce interactions between the player 120 and game of chance or skill. In some embodiments, the game instruction set 220 may include subroutines that present one or more graphics to the user via the user interface 216, subroutines that calculate whether a particular wager has resulted in a win or loss during the game of chance or skill, subroutines for determining payouts for the user in the event of a win during the first game of chance, subroutines for exchanging communications with another device, such as server 116, subroutines for determining bonus opportunities during game play, and any other subroutine useful in connection with facilitating game play at the gaming machine 112.

In some embodiments, the game instruction set 220 may include instructions that initiate and control a roulette wheel spin, initiate and control a card game, initiate and control a dice game, initiate and control a slot game, or execute any other type of game of chance or skill. The game instruction set 220 may also be configured to present outputs (e.g., as Graphical User Interface (GUI) elements) via a display screen when the game of chance is virtualized, includes a video output, or the like. The game instruction set 220 may also be configured to evaluate wagers relative to a particular game outcome to determine if any wagers result in a player win and/or perform any other evaluation desired to facilitate game play.

The wager credit meter 224 may correspond to an instruction set within the gaming machine 112 that facilitates a tracking of wager activity at the gaming machine 112. In some embodiments, the wager credit meter 224 may be used to store or log information related to various user activities and events that occur at the gaming machine 112. The types of information that may be maintained in the wager credit meter 224 include, without limitation, user information, available credit information, wager amount information, and other types of information that may or may not need to be recorded for purposes of accounting for wagers placed at the gaming machine 112 and payouts made for a user during a first game of chance played at the gaming machine 112.

In some embodiments, the wager credit meter 224 may be configured to track coin in activity, coin out activity, coin drop activity, jackpot paid activity, credits applied activity, external bonus payout activity, voucher in activity, voucher out activity, timing of events that occur at the gaming machine 112, and the like. In some embodiments, certain portions of the wager credit meter 224 may be updated in response to outcomes of a game of chance played at the gaming machine 112.

The service interface instruction set 232, when executed by the processor 204, may enable the gaming machine 112 to facilitate customer service requests at the gaming machine 112 and/or in combination with a mobile device 128 of a player 120 that is paired with the gaming machine 112. Specifically, the service interface instruction set 232 may enable a player 120 to engage the user interface 216 and request service from a customer service representative 124. The service interface instruction set 232 may also include instructions that transmit a service request message to the customer interaction management server 116, receive service satisfaction messages from the customer interaction management server 116, and control an active/inactive state of the service indicator 132 based on messages exchanged with the customer interaction management server 116. In some embodiments, the service interface instructions set 232 may also enable the gaming machine 112 to establish a communication channel (e.g., real-time, near-real-time, audio, video, text, chat, etc.) with the customer interaction management server 116 and/or a mobile device 128 of a customer service representative 124 that is assigned to a service request issued at the gaming machine 112. In some embodiments, the communication channel may enable the player 120 to communicate directly and immediately with a customer service representative 124 to facilitate a quick and efficient process for responding to a customer service request of the player 120.

The mobile device communication instruction set 236, when executed by the processor 204, may enable the gaming machine 112 to communicate with the mobile device 128 or multiple mobile devices 128. In some embodiments, the mobile device communication instruction set 236 may include instructions that enable the gaming machine 112 to pair with a mobile device 128 and establish a communication channel with the mobile device 128 via the pairing. As an example, the mobile device communication instruction set 236 may include instructions that enable NFC, Bluetooth®, WiFi, or other types of communication protocols. It should be appreciated that the mobile device communication instruction set 236 may also be updated to reflect when a mobile device 128 is paired with the gaming machine 112 and such pairing information may include addressing information for the mobile device 128 and/or identification information associated with the player 120 or customer service representative 124 that is using the mobile device 128. Alternatively or additionally, the mobile device communication instructions 236 may enable the gaming machine 112 to identify a player 120 that is carrying the mobile device 128 paired with the gaming machine 112, identify a customer service representative 124 that is carrying the mobile device 128 paired with the gamine machine 112, exchange information (e.g., send or receive) with a loyalty application operating on the mobile device 128, or combinations thereof. In some embodiments, the mobile device communication instructions 236 may be configured to operate or drive the network interface 212 to facilitate direct or indirect communications with a mobile device 128.

The gaming machine 112 is further shown to include a ticket issuance device 252, a ticket acceptance device 256, a cash in device 260, and a cash out device 264. The ticket issuance device 252 may be configured to print physical tickets, vouchers, or user loyalty cards. The ticket acceptance device 256 may be configured to receive, scan, and/or recognize information from an input physical ticket, voucher, or user loyalty card. In some embodiments, the ticket issuance device 252 and ticket acceptance device 256 may operate in concert with a common piece of hardware that both accepts and produces physical tickets, vouchers, or the like. Tickets or vouchers printed by ticket issuance device 252 and recognizable by the ticket acceptance device 256 may correspond to physical lottery tickets, casino vouchers, paper coupons, and the like. Alternatively or additionally, the ticket issuance device 252 and/or ticket acceptance device 256 may be connected to a card reading hardware. In such an embodiment, the ticket issuance device 252 and ticket acceptance device 256 may operate as a driver and/or firmware component for the card reader.

Similarly, the cash in device 260 and cash out device 264 may include or operate in concert with a coin slot or any other type of coin delivery mechanism. The cash in device 260 and cash out device 264 may include hardware, drivers, or firmware that facilitate receiving or distributing cash, tokens, bills, etc. In some embodiments, the cash in device 260 may be configured to determine an amount of cash (e.g., in coins, bills, etc.), an amount of tokens, an amount of chips, etc., input at the coin slot and convert the values into credits for playing games with the game instruction set 220. The cash out device 264 may correspond to hardware and software configured to output coins, tokens, bills, chips, etc. if a user decides to cash out or convert playing credits back into cash, tokens, bills, etc.

The gaming machine 112 may, in some embodiments, also include a service button 268. The service button 268 may correspond to a dedicated or non-dedicated type of user input and, therefore, may be considered part of the user interface 216. In some embodiments, the service button 268 may correspond to a physical button or a soft button (e.g., a dynamic button) that is generated on a predetermined portion of a touch-sensitive display and when the predetermined portion of the touch-sensitive display is touched generates a signal for the processor 204. As will be described in further detail herein, the service interface instruction set 232 may be invoked when a player 120 presses the dedicated service button 268 on the gaming machine 112 or when an appropriate input is provided at the mobile device 128 and forwarded to the gaming machine 112. In other words, services provided by the customer interaction management server 116 may be invoked by a player 120 with a paired mobile device 128 or when the player 120 provides an appropriate input at the service button 268. When the player 120 either presses the service button 268 or provides an appropriate input via their paired mobile device 128, the gaming machine 112 may invoke the service interface instruction set 232, which initiates a set of communications with the customer interaction management server 116, thereby enabling the player 120 to have a service request provided to a customer service representative 124. As a non-limiting example, an input provided at the service button 268 may cause the gaming machine 112 to begin receiving audio inputs from the player 120, which can then be transferred to the customer interaction management server 116 as described herein.

Figure 3:
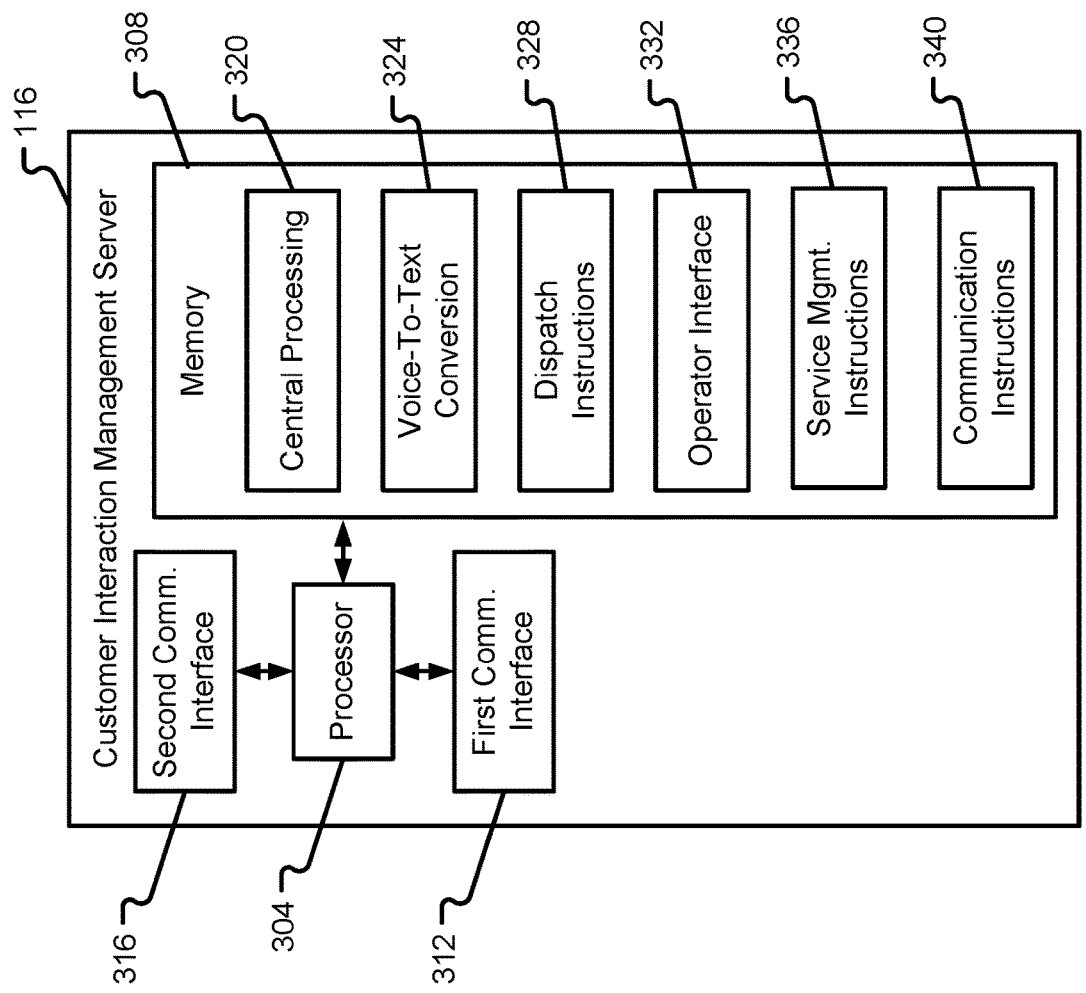
FIG. 3 illustrates a server in accordance with embodiments of the present disclosure.

With reference now to FIG. 3, additional details of a customer interaction management server 116 will be described in accordance with embodiments of the present disclosure. The customer interaction management server 116 is shown to include a processor 304, memory 308, and a plurality of communication interfaces 312, 316. These resources may enable functionality of the customer interaction management server 116 as will be described herein. For instance, the first communication interface 312 may provide the customer interaction management server 116 with the ability to send and receive communication packets or the like over the gaming network 104. The first communication interface 312 may be provided as a network interface card (NIC), a network port, drivers for the same, and the like. Communications between the components of the customer interaction management server 116 and other devices connected to the gaming network 104 may all flow through the first communication interface 312.

The customer interaction management server 116 is also shown to include a second communication interface 316 that facilitates communications via the communication network 108. In some embodiments, the second communication interface 316 may be similar to the first communication interface 312. For instance, the second communication interface 316 may also include a NIC, network port, drivers for the same, and the like. In some embodiments, the first and second communication interfaces 312, 316 may be provided in a single physical component or set of components, but may correspond to different communication channels (e.g., software-defined channels, frequency-defined channels, amplitude-defined channels, etc.) that are used to send/ receive different communications to the mobile devices 128 as compared to the gaming machines 112. In some embodiments, a single communication interface may facilitate communications with both the gaming machines 112 and mobile devices 128, especially if both devices communicate with the customer interaction management server 116 via a common network.

The processor 304 may be similar or identical to the processor 204 and may correspond to one or many computer processing devices. For instance, the processor 304 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 304 may be provided as a microcontroller, microprocessor, Central Processing Unit (CPU), or plurality of microprocessors that are configured to execute the instructions sets stored in memory 308. Upon executing the instruction sets stored in memory 308, the processor 304 enables various authentication functions of the customer interaction management server 116.

The memory 308 may be similar or identical to memory 208 and may include any type of computer memory device or collection of computer memory devices. The memory 308 may include volatile and/or non-volatile memory devices. Non-limiting examples of memory 308 include Random Access Memory (RAM), Read Only Memory (ROM), flash memory, Electronically-Erasable Programmable ROM (EE-PROM), Dynamic RAM (DRAM), etc. The memory 308 may be configured to store the instruction sets depicted in addition to temporarily storing data for the processor 304 to execute various types of routines or functions.

The illustrative instruction sets that may be stored in memory 308 include, without limitation, a central processing instruction set 320, a voice-to-text conversion instruction set 324, a dispatch instruction set 328, an operator interface instruction set 332, a service management instruction set 336, and a communication instruction set 340. Functions of the customer interaction management server 116 enabled by these various instruction sets will be described in further detail herein. It should be appreciated that the instruction sets depicted in FIG. 3 may be combined (partially or completely) with other instruction sets or may be further separated into additional and different instruction sets, depending upon configuration preferences for the customer interaction management server 116. Said another way, the particular instruction sets depicted in FIG. 3 should not be construed as limiting embodiments described herein.

In some embodiments, the central processing instruction set 320, when executed by the processor 304, may enable the customer interaction management server 116 to receive and process various message from gaming machines 112, transmit service request messages to mobile devices 128 or other devices operated by customer service representatives 124, transmit service satisfaction messages to gaming machines 112, and generally control the customer service process for the plurality of gaming machines 112. Thus, in some embodiments, the central processing instruction set 320 may be configured to call or invoke other instruction sets in memory 308 as part of ensuring that a service request issued at a gaming machine 112 or by a player 120 at their mobile device 128 is appropriately and efficiently responded to by a customer service representative 124.

The voice-to-text conversion instruction set 324, when invoked by the central processing instruction set 320 and when executed by the processor 304, may enable the customer interaction management server 116 to receive voice or audio-based messages and then convert some or all of such messages into text. As an example, the voice-to-text conversion instruction set 324 may be configured to convert audio-based messages into text-based messages, which can then be transmitted to a mobile device 128 of a customer service representative 124 that is servicing a particular service request for a player 120. The voice-to-text conversion instruction set 324 may also be configured to perform other types of conversions without departing from the scope of the present disclosure. For instance, the voice-to-text conversion instruction set 324 may be configured to perform text-to-speech conversions, video-to-text conversions, or the like. In some embodiments, the output of the voice-to-text conversion instruction set 324 may be provided back to the central processing instruction set 320 for further processing by other instruction sets of the customer interaction management server 116.

The dispatch instruction set 328, when invoked by the central processing instruction set 320 and when executed by the processor 304, may enable the customer interaction management server 116 to determine a customer service representative 124 that is available and appropriately skilled to handle a customer service request. The dispatch instruction set 328 may also be configured to identify the address information for a mobile device (or other type of communication device) used by the selected customer service representative 124. In the event that an originally-selected customer service representative 124 is unable to respond to a service request or does not accept the service request when assigned thereto, the dispatch instruction set 328 may be configured to identify an alternative customer service representative 124 to service the request. In some embodiments, the dispatch instruction set 328 may notify the central processing instruction set 320 of the selected customer service representative 124 and/or the destination address for the mobile device 128 being used by the selected customer service representative thereby enabling the central processing instruction set 320 to establish communications between the mobile device 128 of the customer service representative 124 and the player 120 (e.g., via the gaming machine 112 and/or the mobile device 128 of the player 120). Alternatively, the dispatch instruction set 328 may notify other subroutines or instruction sets in memory 308 of the selected customer service representative 124 and the addressing information for the mobile device 128 being used by the selected customer service representative 124.

The operator interface instruction set 332, when invoked by the central processing instruction set 320 and when executed by the processor 304, may enable the customer interaction management server 116 to transmit control messages or commands to the gaming machines 112 as part of controlling hardware components of the gaming machines 112 when a service request is being processed. For instance, the operator interface instruction set 332 may be configured to transmit messages or commands to the gaming machines 112 that control an active/inactive state of the service indicator 132. Alternatively or additionally, the operator interface instruction set 332 may provide the customer service representatives 124 with a web-based portal that enables the customer service representatives 124 to diagnose and respond to service requests. The operator interface instruction set 332 may alternatively or additionally enable a player 120 to view a status of their service requests through a web-based portal. Thus, the operator interface instructions 332 may include the capability of generating and rendering web-based documents or content to a mobile device 128, whether the mobile device 128 is operated by a player 120 or a customer service representative 124.

The service management instruction set 336, when invoked by the central processing instruction set 320 and when executed by the processor 304, may enable the customer interaction management server 116 to track a status of a service request and transmit appropriate messages to the gaming machine 112 and/or mobile devices 128 involved in a service request that describe the status of the service request. For instance, the service management instruction set 336 may be configured to determine an estimated wait time for a service request to be completely addressed by a customer service representative 124 and then communicate that information back to a gaming machine 112 and/or mobile device 128 of a player 120. Alternatively or additionally, the service management instruction set 336 may be configured to inform the player 120 that their service request has been assigned to a particular customer service representative 124 and may further identify a current location of that customer service representative 124 within the casino (or relative to the gaming machine 112). As a customer service representative 124 processes a service request, the status of progress (e.g., a remaining time to completion or remaining percentage of the service request that remains incomplete) may be communicated back to the player 120, thereby providing the player 120 with a sense of how much additional work and time are required before the service request is completely addressed.

The communication instruction set 340, when invoked by the central processing instruction set 320 and when executed by the processor 304, may enable the customer interaction management server 116 to communicate with the other devices in the system 100. For instance, the communication instruction set 340 may be configured to modulate/demodulate communications exchanged over the gaming network 104 and/or communication network 108, determine timings associated with such communications, determine addresses associated with such communications, etc. In some embodiments, the communication instruction set 340 may be configured to allocate communication ports of the customer interaction management server 116 for use as either the first or second communication interface 312, 316 as appropriate. The communication instruction set 340 may further be configured to generate messages in accordance with communication protocols used by the networks 104, 108 and to parse messages received via the networks 104, 108. In some embodiments, the communication instruction set 340 may be configured to transmit messages to destination addresses identified by other instruction sets stored in memory 308. The communication instruction set 340 may also be configured to receive messages from a communication interface 312, 316 and process the messages such that they are capable of being processed by other instruction sets stored in memory 308.

With reference now to FIGS. 4-7, various operations of a gaming machine 112, server 116, and/or mobile device 128 will be described in accordance with at least some embodiments of the present disclosure. It should be appreciated that any of the methods may be combined or separated and that any of the steps of any method disclosed herein can be included in other methods. Similarly, any of the steps of any method may be performed in a different order or in parallel, depending upon capabilities of the device(s) implementing the methods.

Figure 4:
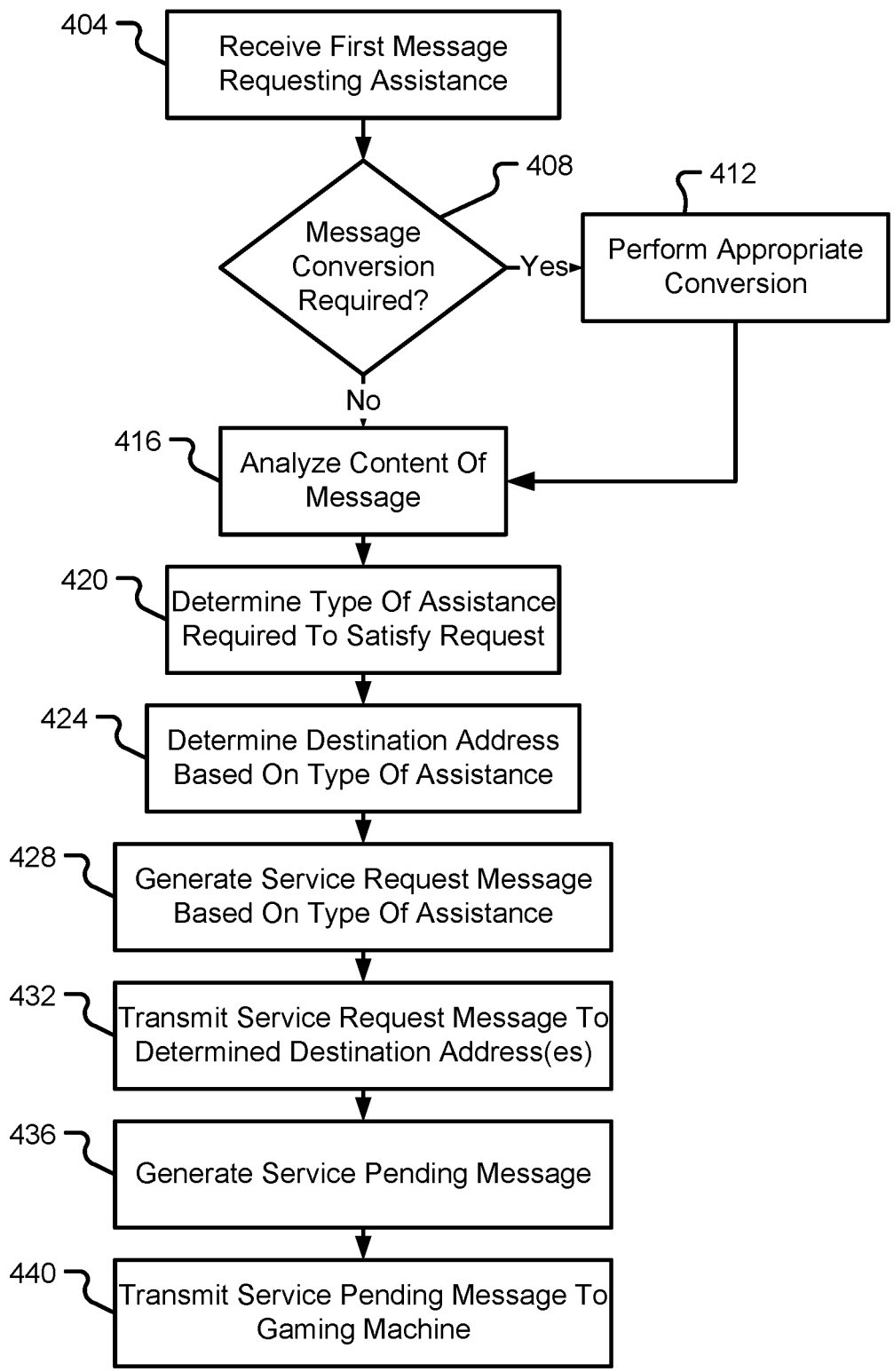
FIG. 4 is a flow chart illustrating a first method in accordance with embodiments of the present disclosure.

With reference now to FIG. 4, a first method will be described in accordance with at least some embodiments of the present disclosure. The method begins when a first message is received at the customer interaction management server 116 (step 404). The first message may correspond to a message transmitted by a gaming machine 112 and requesting assistance. More specifically, the first message may have been initiated or transmitted from the gaming machine 112 based on inputs of a player 120 at the gaming machine 112. The first message may correspond to a message requesting service at the gaming machine 112, a message reporting a problem with the gaming machine 112, a message requesting beverage or food service for the player 120 at the gaming machine 112, a message indicating that security should be sent toward the gaming machine 112, or combinations thereof. The specific inputs that initiate the transmission of the first message may include the player 120 touching or pressing the service button 268 of the gaming machine 112 or by the player 120 providing a predetermined input to the gaming machine 112 via the player's 120 mobile device 128 when the mobile device 128 is paired with the gaming machine 112 (or possibly not paired with the gaming machine 112).

The method continues with the central processing instruction set 320 determining whether or not any conversion of message format is required (step 408). If so, the central processing instruction set 320 may invoke the voice-to-text conversion instruction set 324 to perform an appropriate conversion of the message content (step 412). For instance, the voice-to-text conversion instruction set 324 may convert audio content of the first message into text. Some or all of the message content may be converted and it should be appreciated that conversions other than voice-to-text can be performed in this step.

Thereafter, or in the event that the query of step 408 is answered negatively, the central processing instruction set 320 may analyze the content of the first message (step 416). The content may be analyzed to determine a type of assistance that is required to satisfy the service request (step 420). In some embodiments, the message may be analyzed for one or more keywords that can be mapped or associated to a particular type of service. For example, words like "drink", "beer", "whiskey", "fries", or other names of menu items may be associated with a beverage or food service request. As another example, words like "broken", "stopped", "machine", or other words associated with possible technical problems may be associated with a machine trouble type of service request. In some embodiments, the central processing instruction set 320 may be configured to perform a sentiment analysis on the message to determine a type of assistance required to satisfy the user request. The sentiment analysis may be performed by an Artificial Intelligent (AI) engine or collection of neural networks that have been trained on a plurality of service messages. Any other type of message analysis process may be performed in step 416 as part of determining a content of the message. In some embodiments, the gaming machine 112 may be equipped with different types of service request buttons or inputs that enable the player 120 to specify the type of assistance required prior to transmitting the message to the customer interaction management server 116. Thus, the player 120 may simply select the "beverages" input, the "trouble" input, the "payment help" input, or any other type of predefined input at the gaming machine 112.

The method may further continue with the central processing instruction set 320 invoking the dispatch instruction set 328 to identify and select a customer service representative 124 that is available and appropriately skilled to satisfy or process the service request. The dispatch instruction set 328 may also be configured to determine a destination address (e.g., IP address, telephone number, chat alias, MAC address, etc.) of a mobile device 128 that is assigned to the selected customer service representative 124 (step 424). The outputs generated by the dispatch instruction set 328 may then be provided back to the central processing instruction set 320, which may generate one or more service request messages based on the determined type of assistance and the determined destination address(es) (step 428). Alternatively, the service request message may be generated by the dispatch instruction set 328.

The service request message(s) are then processed by the communication instruction set 340 so that the service request message(s) can be transmitted to the determined destination address(es) (step 432). In some embodiments, the service request message(s) may be transmitted via the gaming network 104 and/or via the communication network 108 to the mobile device 128 of the selected customer service representative 124.

The method may further include the service management instruction set 336 generating a service pending message (step 436) that can be transmitted back to the gaming machine 112 that initially transmitted the first message to the customer interaction management server 116 (step 440). In some embodiments, the service pending message enables the gaming machine 112 to display information (e.g., via the user interface 216) to the player 120 indicating that the player's service request has been transmitted to a customer service representative 124. In some embodiments, the service pending message may further provide information describing the selected customer service representative and a type of service that was determined by the customer interaction management server 116. By displaying the determined type of service, the player 120 may be allowed to correct an incorrectly determined type of service or be informed as to the type of service that will be provided when the customer service representative 124 begins working on the service request. In some embodiments, the service pending message may further include an estimated wait time for the service request to be completed. This information presented to the player 120 at the gaming machine 112 may be continuously or periodically updated by the customer interaction management server 116. For instance, as updates to the service are indicated by the customer service representative 124, the customer interaction management server 116 may transmit additional update messages to the gaming machine 112 that cause the gaming machine 112 to present the information from the update message(s). Alternatively or additionally, the service pending message may be transmitted to the player's 124 mobile device 128 either directly from the customer interaction management server 116 or via a communication path that flows through the gaming machine 112.

Figure 5:
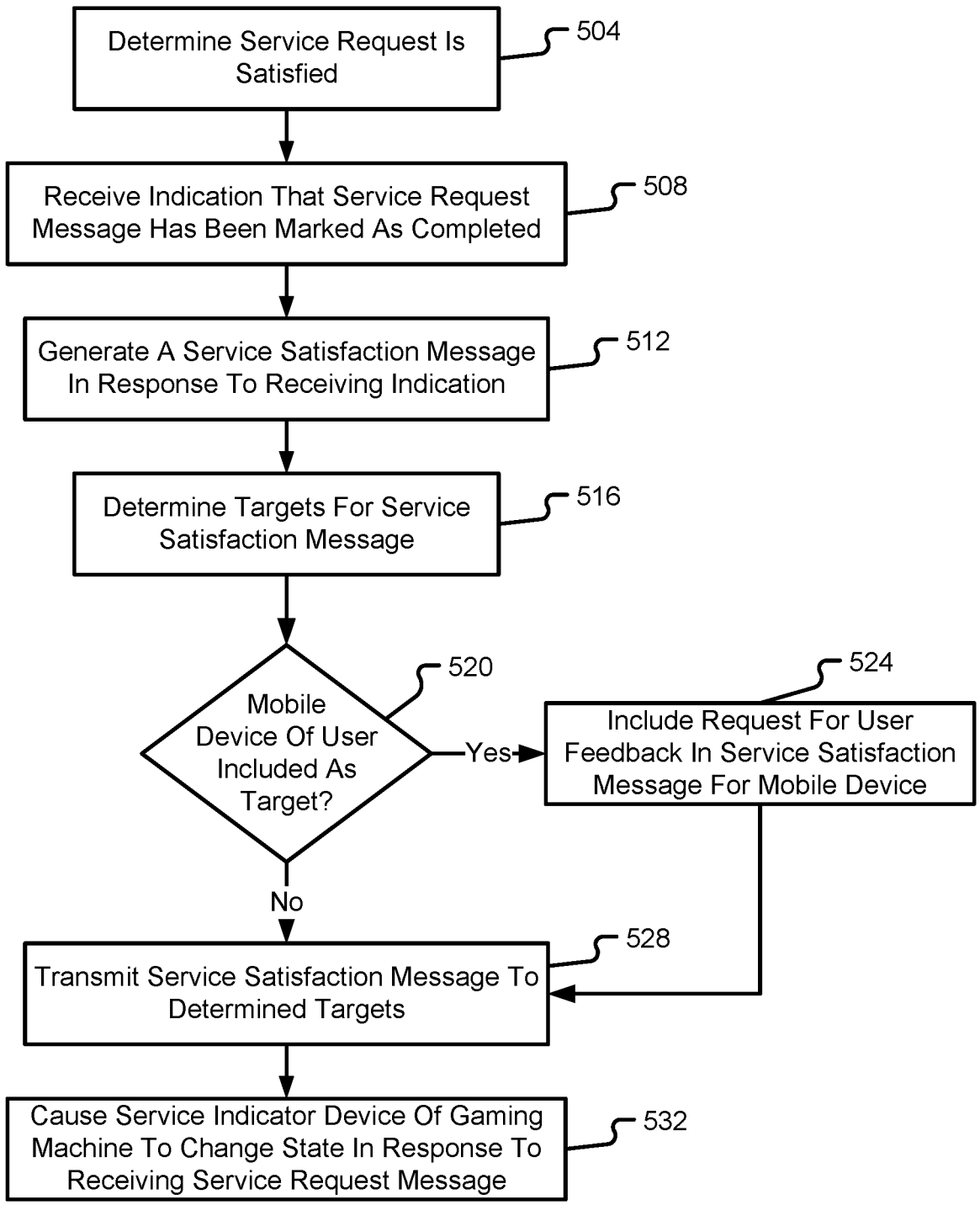
FIG. 5 is a flow chart illustrating a second method in accordance with embodiments of the present disclosure.

With reference now to FIG. 5, another method will be described in accordance with at least some embodiments of the present disclosure. The method begins when a customer service representative 124 determines that a service request they were processing has been satisfied or completely serviced (step 504). When the customer service representative 124 makes this determination (possibly based on input from the player 120 indicating that they are satisfied with the service provided to them), the method continues with the customer service representative 124 marking the service request message associated with the service request as completed (step 508). In some embodiments, the marking of a service request message as complete may include the customer service representative 124 sending a respond message back to the customer interaction management server 116 indicating that service is complete. Alternatively or additionally, the customer service representative 124 may select an input included in the service request message that causes the service request message to close and then a message is sent back to the customer interaction management server 116 indicating that the service for the message is believed to be complete.

The method then continues with the central processing instruction set 320 operating in cooperation with the service management instruction set 336 to generate a service satisfaction message (step 512). The service management instruction set 336 may then determine one or more target devices for the service satisfaction message (step 516). The one or more target devices for the service satisfaction message may include the gaming machine 112 that the player 120 used to initiate the service request, a mobile device 128 of the player 120, or any other device that is determined to be within a predetermined physical proximity of the player 120 that initiated the service request.

After the target devices have been determined, the method continues with the service management instruction set 336 determining whether a mobile device of the player 120 is included in the target devices (step 520). If this query is answered positively, then the service management instruction set 336 may include a request for feedback from the player 120 and the service satisfaction message may be particularly formatted for transmission to a mobile device 128 (e.g., with appropriate UI settings) (step 524).

Thereafter, or if the query of step 524 is answered negatively, the method continues with the central processing instruction set 320 invoking the communication instruction set 340 to transmit the service satisfaction message(s) to the determined targets (step 528). In some embodiments, a service satisfaction message transmitted to a gaming machine 112 may include a script or command that causes the gaming machine 112 to change its service indicator 132 from one state to another state to reflect the fact that the service request message has been marked as completed (step 532). As a non-limiting example, the service indicator 132 may be switched to an inactive state (e.g., a light is turned off or an alarm is no longer sounded) in response to the gaming machine 112 receiving the service satisfaction message.

Figure 6:
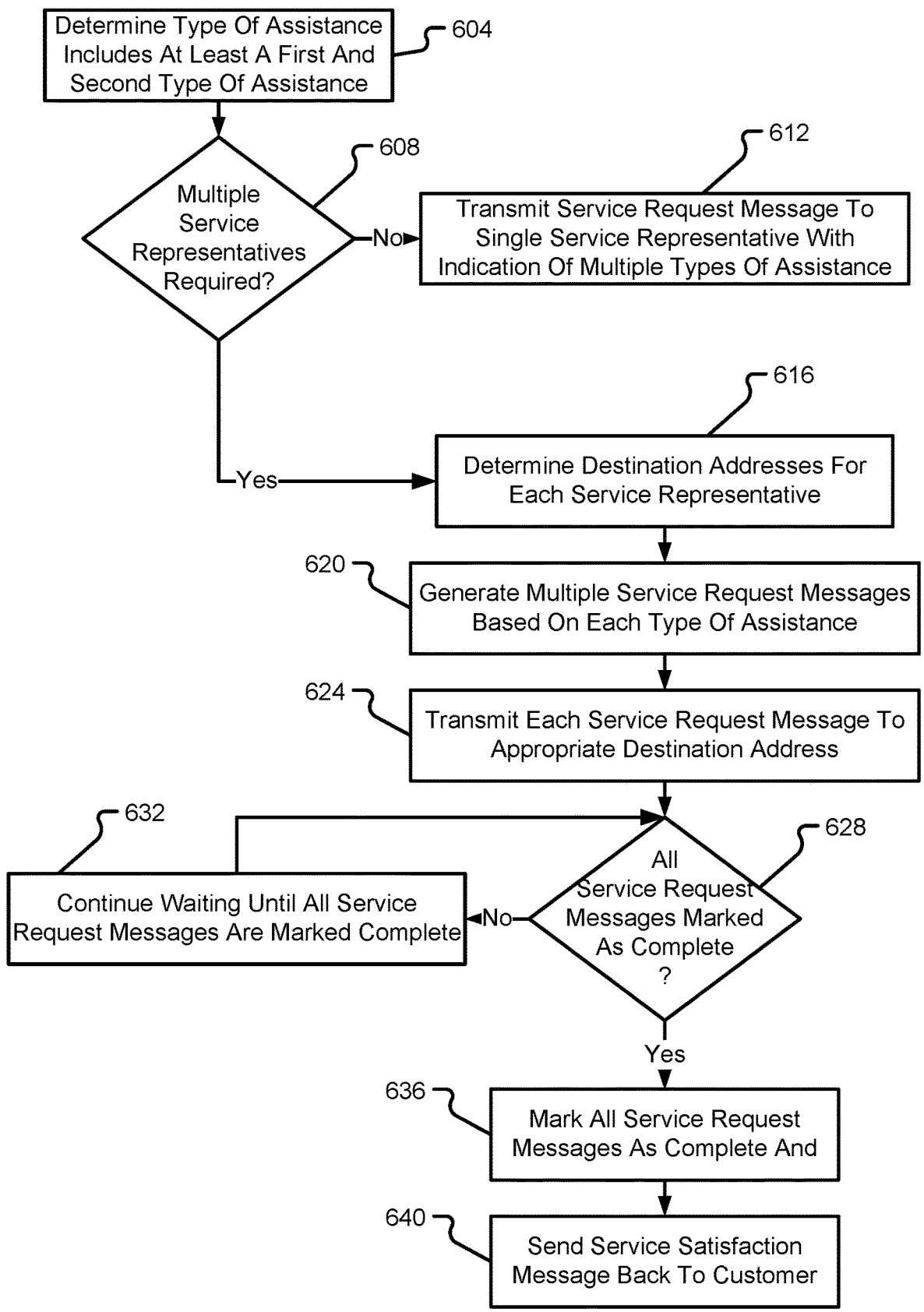
FIG. 6 is a flow chart illustrating a third method in accordance with embodiments of the present disclosure.

With reference now to FIG. 6, another method will be described in accordance with at least some embodiments of the present disclosure. The method begins with the central processing instruction set 320 and/or service management instruction set 336 determining that a type of assistance required for a particular service request received from a gaming machine 112 includes at least a first type of assistance and a second type of assistance (step 604).

The method continues with the service management instruction set 336 determining whether multiple customer service representatives 124 are required to satisfy the first type of assistance and second type of assistance (e.g., based on skills requirements for both types of assistance and based on analysis of the service request message received from the gaming machine 112) (step 608). If the query of step 608 is answered negatively, then the method continues with the customer interaction management server 116 generating and sending a single service request message to a single selected customer service representative 124, but with an indication of the multiple types of assistance needed (step 612). This particular step may be achievable if the two types of assistance can be satisfied by a customer service representative 124 having a single skill type or if a particular customer service representative 124 possesses the multiple skills required to service the multiple different types of assistance determined in step 604.

If the query of step 608 is answered affirmatively, then the method proceeds with the central processing instruction set 320 and/or dispatch instruction set 328 determining destination addresses for each customer service representative 124 (step 616). In some embodiments, the messaging addresses for each mobile device 128 of each customer service representative 124 may be determined in step 616, possibly in a similar fashion to the process used in step 424 of FIG. 4.

The method continues with the customer interaction management server 116 generating multiple service request messages for each type of assistance, based on each type of assistance (step 620) and then transmitting those messages to the appropriate destination addresses that were determined in step 616 (step 624). These steps may be similar to steps 428 and 432 of FIG. 4. The service management instruction set 336 may then monitor the status of each service request sent to each of the destination addresses. In some embodiments, the service management instruction set 336 may continuously or periodically determine whether all of the service request messages have been marked as complete by each of the different customer service representatives 124 (step 628). If this query is answered negatively, then the service management instruction set 336 may continue waiting and monitoring status of the various service request messages until all service request messages have been marked as completed (step 632).

Once the query of step 628 is answered affirmatively, the method continues with the service management instruction set 336 updating its internal electronic records to indicate that all service request messages have finally been marked as completed (step 636). Thereafter, the central processing instruction set 320 may generate and send a service satisfaction message back to the player 120 via the player's 120 mobile device 128 and/or via the gaming machine 112 (step 640).

Figure 7:
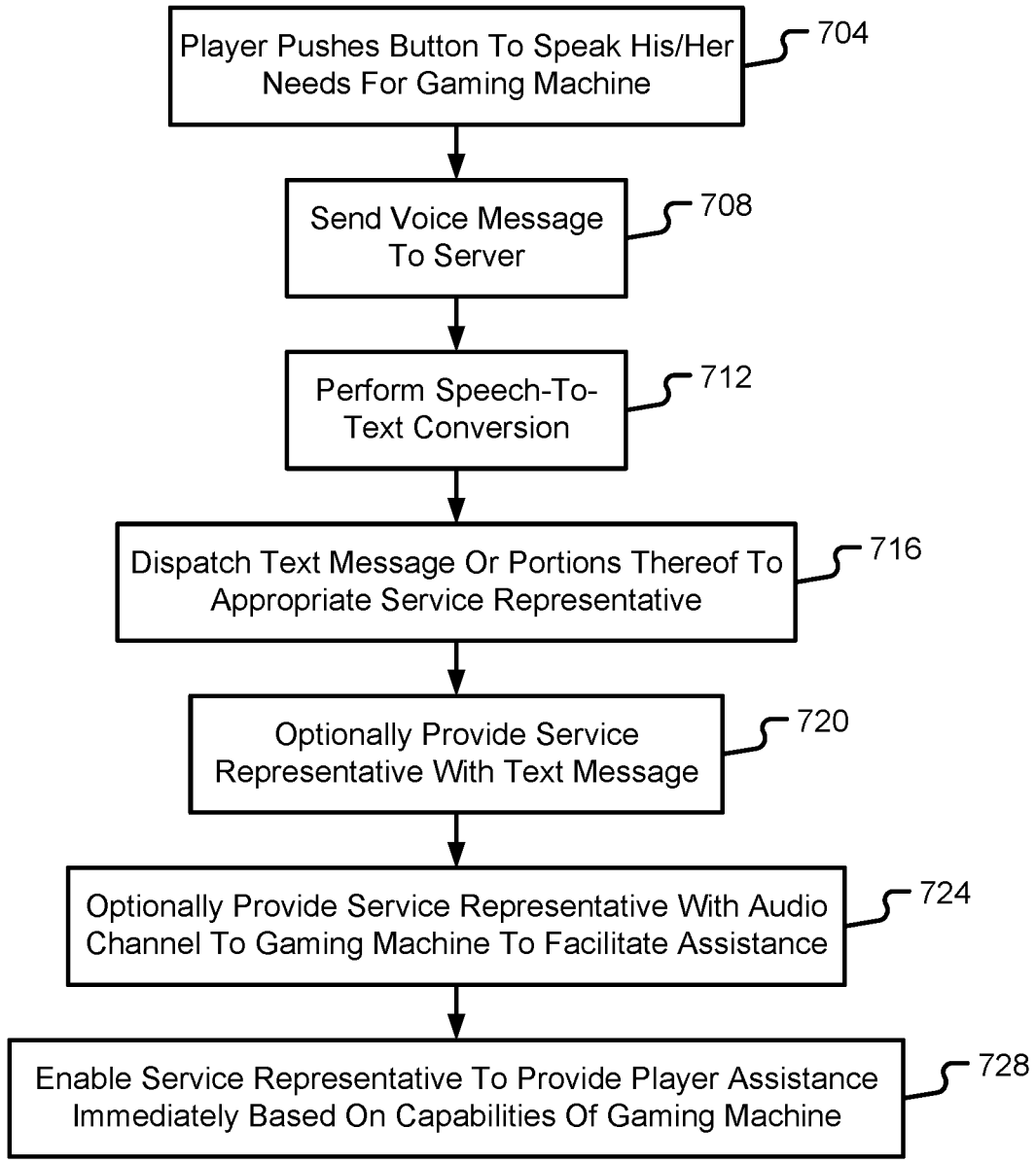
FIG. 7 is a flow chart illustrating a fourth method in accordance with embodiments of the present disclosure.

With reference now to FIG. 7, details of another method will be described in accordance with at least some embodiments of the present disclosure. The method begins when a player 120 pushes a button (e.g., the service button 268) or other type of input device at the gaming machine 112 and then speaks his/her needs for the gaming machine 112 (step 704). The gaming machine 112 may record the audio content of the player 120 and generate an audio message that is transmitted to the customer interaction management server 116 via the gaming network 104 in one or more communication packets, as an audio stream, and/or in an audio file (step 708).

The method continues with the central processing instruction set 320 invoking the voice-to-text conversion instruction set 324 to perform a speech-to-text conversion on the audio content received from the gaming machine 112 (step 712). The central processing instruction set 320 may then invoke the dispatch instruction set 328 to select customer service representatives 124 to service the player's 120 request. In some embodiments, the customer interaction management server 116 is configured to dispatch the text-version of the service request message that was output by the voice-to-text conversion instruction set 324 (step 716). The text-version of the message produced by the player 120 (or portions thereof) may be provided to the customer service representative 124 alone or in combination with a service request message specifically generated by the customer interaction management server 116 (step 720).

The method may further continue with the customer interaction management server 116 facilitating the establishment of an audio channel between the gaming machine 112 at which the player 120 is situated and the mobile device 128 of the customer service representative 124 (step 724). The establishment of the audio channel may enable the customer service representative 124 to immediately provide service and communicate with the player 120 that has requested service without requiring the player 120 to leave the gaming machine 112. In some embodiments, the nature of the audio channel established between the gaming machine 112 and mobile device 128 may depend upon the capabilities of the gaming machine 112 and/or the nature of the service request (step 728).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method of responding to a service request, the method comprising:
    receiving, at a processor, a message indicating that a user has requested assistance in connection with an operation of a gaming machine;
    analyzing, with the processor, content of the message to determine a type of assistance required to satisfy the user request;
    selecting, with the processor, a service representative that is currently available and appropriately skilled to satisfy the user request by providing the type of assistance required to satisfy the user request;
    determining, with the processor, a destination address for a service communication device of the selected service representative, wherein the service communication device is selected based on the type of assistance required to satisfy the user request and a skill of the service representative;

generating, with the processor, a service request message that is formatted based on the type of assistance required to satisfy the user request; and transmitting, with the processor and via a communication network, the service request message to the destination address.

2. The method of claim 1, wherein the message is received as an audio message, the method further comprising:

performing, with the processor, a speech-to-text conversion of the audio message to create a text message;

parsing, with the processor, the text message for a keyword;

performing a sentiment analysis on the text message; and based on the parsing and sentiment analysis, determining, with the processor, the type of assistance required to satisfy the user request.

3. The method of claim 2, further comprising:

including at least some of the text message and at least some of the audio message in the service request message transmitted to the destination address.

4. The method of claim 1, further comprising:

receiving, at the processor, an indication that the service request message has been marked as completed in response to the selected service representative satisfying the user request;

generating, at the processor and in response to receiving the indication that the service request message has been marked as completed, a service satisfaction message; and transmitting, with the processor, the service satisfaction message to the gaming machine.

5. The method of claim 4, further comprising:

transmitting, with the processor, the service satisfaction message to a mobile device associated with the user; and requesting feedback from the user regarding a customer service satisfaction rating.

6. The method of claim 4, further comprising:

causing a service indicator device of the gaming machine to change from an operational state to a non-operational state in response to receiving the indication that the service request message has been closed.

7. The method of claim 1, further comprising:

determining, with the processor, that the type of assistance required to satisfy the user request comprises a first type of assistance and a second type of assistance;

determining, with the processor, that the first type of assistance and second type of assistance require different service representatives to satisfy the user request;

determining, with the processor, an additional destination address for an additional service communication device, wherein the service communication device is selected based on the first type of assistance, and wherein the additional service communication device is selected based on the second type of assistance;

generating, with the processor, an additional service request message that is formatted based on the second type of assistance; and transmitting, with the processor and via the communication network, the additional service request message to the additional service communication device.

8. The method of claim 7, further comprising:

marking the service request message as being completed in response to receiving an indication that the additional service request message has been marked as completed.

9. The method of claim 1, further comprising:

generating, at the processor, a service pending message; and transmitting, with the processor, the service pending message to the gaming machine to enable the gaming machine to display information to the user that the service request message has been transmitted to the destination address.

10. The method of claim 9, wherein the service pending message comprises a description of the type of assistance and an estimated wait time for receiving the requested assistance.

11. A gaming system, comprising:

a communication interface;

a processor coupled with the communication interface; and a computer-readable storage medium, coupled with the processor, comprising instructions that are executable by the processor, wherein the instructions comprise instructions that:

receive a message from a gaming machine indicating that a user has requested assistance;

analyze the message to determine a type of assistance required to satisfy the user request;

select a service representative that is currently available and appropriately skilled to satisfy the user request by providing the type of assistance required to satisfy the user request;

determine a destination address for a service communication device of the selected service representative, wherein the service communication device is selected based on the type of assistance required to satisfy the user request and a skill of the service representative; and cause a service request message to be transmitted to the destination address via the communication interface.

12. The gaming system of claim 11, wherein the message comprises an audio message and wherein the instructions further comprise:

instructions that convert the message from an audio message to a text message.

13. The gaming system of claim 12, wherein the instructions further comprise instructions that:

parse the text message for a keyword;

perform a sentiment analysis on the text message; and determine, based on the parsing of the text message and the sentiment analysis, the type of assistance required to satisfy the user request.

14. The gaming system of claim 11, wherein the instructions further comprise instructions that:

receive an indication that the service request message has been marked as completed in response to the selected service representative satisfying the user request;

generate, in response to receiving the indication that the service request message has been marked as completed, a service satisfaction message; and cause the service satisfaction message to be transmitted to the gaming machine.

15. The gaming system of claim 14, wherein the instructions further comprise instructions that:

cause the service satisfaction message to be transmitted to a mobile device associated with the user; and request feedback from the user regarding a customer service satisfaction rating.

16. The gaming system of claim 11, wherein the instructions further comprise instructions that:
generate a service pending message; and
cause the service pending message to be transmitted to the gaming machine to enable the gaming machine to display information to the user that the service request message has been transmitted to the destination address.

17. A server that manages a plurality of gaming machines, comprising:
a processor; and
a computer-readable storage medium, coupled with the processor, comprising instructions that are executable by the processor, wherein the instructions comprise instructions that:
receive a message indicating that a user has requested assistance in connection with a gaming machine;
analyze the message to determine a type of assistance required to satisfy the user request;
select a service representative that is currently available and appropriately skilled to satisfy the user request by providing the type of assistance required to satisfy the user request;
determine a destination address for a service communication device of the selected service representative, wherein the service communication device is selected based on the type of assistance required to satisfy the user request and a skill of the service representative; and
cause a service request message to be transmitted to the destination address.

18. The server of claim 17, wherein the message comprises an audio message and wherein the instructions further comprise instructions that:
convert the message from an audio message to a text message;
parse the text message for a keyword;
perform a sentiment analysis on the text message; and
determine, based on the parsing of the text message and the sentiment analysis, the type of assistance required to satisfy the user request.

19. The server of claim 17, wherein the instructions further comprise instructions that:
receive an indication that the service request message has been marked as completed in response to the selected service representative satisfying the user request;
generate, in response to receiving the indication that the service request message has been marked as completed, a service satisfaction message;
cause the service satisfaction message to be transmitted to the gaming machine;
cause the service satisfaction message to be transmitted to a mobile device associated with the user; and
request feedback from the user regarding a customer service satisfaction rating.

20. The server of claim 17, further comprising instructions that:
generate a service pending message; and
cause the service pending message to be transmitted to the gaming machine and cause the gaming machine to display information to the user that the service request message has been transmitted to the destination address.

* * * * *